(12) United States Patent
Waller

(10) Patent No.: US 11,955,023 B1
(45) Date of Patent: Apr. 9, 2024

(54) STRINGED INSTRUMENT BOW HOLD TRAINING DEVICE

(71) Applicant: Nathan Waller, Newport, MN (US)

(72) Inventor: Nathan Waller, Newport, MN (US)

( * ) Notice: Subject to any disclaimer, the term of this patent is extended or adjusted under 35 U.S.C. 154(b) by 0 days.

(21) Appl. No.: 17/963,784

(22) Filed: Oct. 11, 2022

(51) Int. Cl.
*G09B 15/06* (2006.01)
*G10G 7/00* (2006.01)

(52) U.S. Cl.
CPC ............... *G09B 15/06* (2013.01); *G10G 7/00* (2013.01)

(58) Field of Classification Search
CPC .................................. G09B 15/06; G10G 7/00
See application file for complete search history.

(56) References Cited

U.S. PATENT DOCUMENTS

| | | | | |
|---|---|---|---|---|
| 1,275,202 A * | 8/1918 | Becker | ..................... | G10D 1/02 84/274 |
| 1,673,996 A * | 6/1928 | Rathsach | ................. | G10D 3/16 984/122 |
| 1,763,660 A * | 6/1930 | Knopp | ..................... | G10D 3/16 984/122 |
| 1,897,225 A * | 2/1933 | Archer | ..................... | G10D 3/16 984/122 |
| 2,477,365 A * | 7/1949 | Dissinger | ................. | G10D 3/16 84/281 |
| 2,820,388 A * | 1/1958 | Rolland | ................... | G10D 3/16 984/122 |
| 3,839,938 A * | 10/1974 | Williams | ............... | G09B 15/06 84/282 |
| 5,355,757 A * | 10/1994 | Plummer | ............... | G10D 3/166 84/283 |
| 5,670,727 A * | 9/1997 | Xiao | ...................... | G09B 15/06 84/283 |
| 5,783,762 A * | 7/1998 | Lindauer | .................. | G10D 3/16 84/453 |
| 6,162,981 A | 12/2000 | Newcomer et al. | | |
| 7,595,441 B1 * | 9/2009 | DuBell-Shockley | .. | G09B 15/06 84/282 |
| 7,622,663 B2 | 11/2009 | Casillas et al. | | |
| 7,968,777 B1 | 6/2011 | Davis | | |
| D650,828 S | 12/2011 | Kimmons | | |
| D650,829 S | 12/2011 | Kimmons | | |

(Continued)

FOREIGN PATENT DOCUMENTS

CN 2836135 11/2006
CN 201522843 U 7/2010

(Continued)

OTHER PUBLICATIONS

"Bow Hold Buddies and CelloPhant," Web page, https://www.things4strings.com, 5 pages, retrieved on Sep. 6, 2022.

(Continued)

*Primary Examiner* — Robert W Horn
(74) *Attorney, Agent, or Firm* — Lund IP PLLC

(57) ABSTRACT

A bow hold training device includes a replica bow stick shaft, a replica bow stick frog extending from a bottom side of the replica bow stick shaft, and at least one landmark corresponding to a contact point of a finger or thumb with a proper bow hold on the bow hold training device. The device helps musicians learn and reproduce a proper bow hold for playing a stringed instrument, such as a violin, viola, cello, or bass.

20 Claims, 3 Drawing Sheets

(56) References Cited

U.S. PATENT DOCUMENTS

| | | | |
|---|---|---|---|
| D650,830 S | 12/2011 | Kimmons et al. | |
| 8,273,973 B2 * | 9/2012 | Kimmons | G10D 3/16 84/282 |
| 8,969,693 B2 | 3/2015 | Wagoner et al. | |
| 10,510,326 B1 * | 12/2019 | Wada | G10D 3/16 |
| 11,727,821 B2 * | 8/2023 | Melrose | G10G 7/00 84/485 R |
| 2008/0271585 A1 | 11/2008 | Jones | |
| 2011/0113947 A1 | 5/2011 | Wagoner | |
| 2015/0339945 A1 * | 11/2015 | Dubell-Shockley | G10D 3/16 84/470 R |
| 2019/0213907 A1 | 7/2019 | Reaoch | |
| 2022/0005375 A1 * | 1/2022 | Carter | G09B 15/06 |
| 2022/0189440 A1 * | 6/2022 | Furlow | G10D 1/02 |

FOREIGN PATENT DOCUMENTS

| | | | | |
|---|---|---|---|---|
| FR | 3100078 A1 * | 2/2021 | | G09B 15/06 |
| FR | 3120730 A1 * | 9/2022 | | |
| SU | 1208580 A1 | 1/1986 | | |
| WO | 2007040299 A1 | 4/2007 | | |

OTHER PUBLICATIONS

"Bow Master Bow Grip—Medium," Web Page, https://www.thesoundpost.com/en/store/accessories/miscellaneous/bow-master-bow-grip-medium, 1 page, retrieved on Sep. 6, 2022.

"BowGrip by AcoustaGrip," Web page, https://www.acoustagrip.com/products/bowgrip-by-acoustagrip, 2 pages, retrieved on Sep. 6, 2022.

"Pinky Toobs Bow-Holding Aids | G'DAE Music LLC," Web page, https://www.gdaemusic.com/content/shop/pinky-toobs-bow-holding aids/, 3 pages, retrieved on Sep. 6, 2022.

"PinkyHold for violin/viola, Sky Blue | Johnson String Instrument," Web page, https://www.johnsonstring.com/cgi-bin/music/scripts/violin-viola-cello-music.cgi?itemno=ACVVPH001_S, 6 pages, retrieved on Sep. 6, 2022.

"PM Music Center—Young Musicians PN1 Pinkinest Bow Aid," Web page, https://www.pmmusiccenter.com/p-1649-young-musicians-pn1-pinkinest-bow-aid.aspx, 4 pages, retrieved on Sep. 6, 2022.

"STRINGVISION | Stringvision Bow Grip," Web page, https://www.westmusic.com/band-orchestra/orchestral-string-instrument-accessories/orchestral-string-instrument-bows/354737, 4 pages, retrieved on Sep. 6, 2022.

"The Broadbent Doodlebow," Web page, http://doodlebow.com/, 3 pages, retrieved on Sep. 6, 2022.

"Wada Bow Grip Cello—Wada Bow Grip, LLC," Web page, https://wadabowgrip.com/products/wada_bowgrip_cello, 4 pages, retrieved on Sep. 6, 2022.

* cited by examiner

STRINGED INSTRUMENT BOW HOLD TRAINING DEVICE

TECHNICAL FIELD

This disclosure relates to musical instruments, and, more particularly, but without limitation, to training techniques for musicians.

BRIEF SUMMARY

Bow grip training devices disclosed herein help musicians learn and reproduce a proper bow hold for playing a stringed instrument, such as a violin, viola, cello, or bass. A proper bow hold allows a musician to control the path and placement of the bow to vibrate desired strings and produce clear tones. The disclosed training devices include replica bow stick shaft with a bow stick frog and at least one landmark indicating the proper position of a finger or thumb. The replica bow stick shaft may be shorter than a bow stick shaft, allowing a musician to practice a proper bow hold without the weight of a full bow.

In one example, a bow hold training device includes a replica bow stick shaft, a replica bow stick frog extending from a bottom side of the replica bow stick shaft, and at least one landmark corresponding to a contact point of a finger or thumb with a proper bow hold on the bow hold training device.

In another example, is a method of practicing a bow hold with the bow hold training device includes locating the thumb of a user on a thumb landmark of the bow hold training device, locating the index finger of the user on an index finger landmark of the bow hold training device, locating the pinkie finger of the user on a pinkie finger landmark of the bow hold training device, and locating the ring finger and the middle finger of the user on the replica bow stick frog of the bow hold training device.

DETAILED DESCRIPTION

Figure 1A:
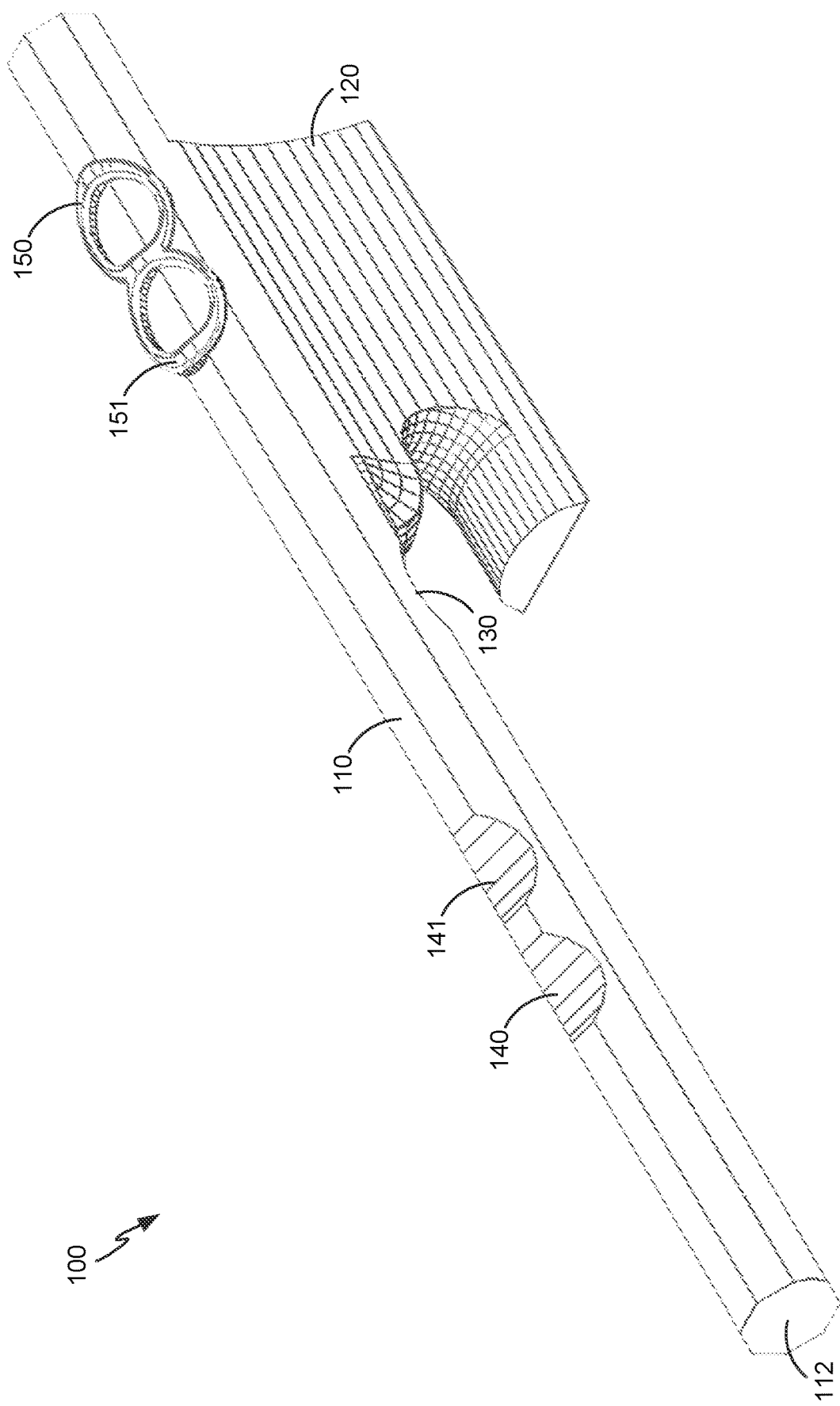
FIGS. 1A-1E illustrate a bow hold training device suitable for learning and practicing proper grip and finger placement for holding a bow for a stringed instrument.
Figure 1B:
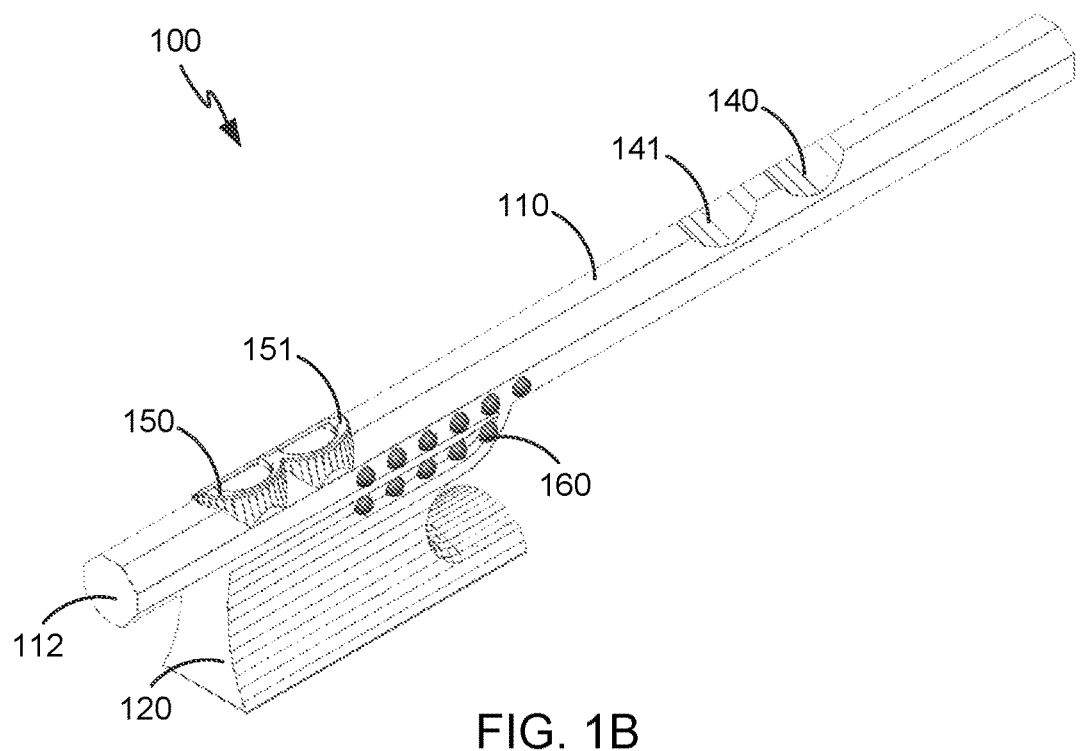
Figure 1C:
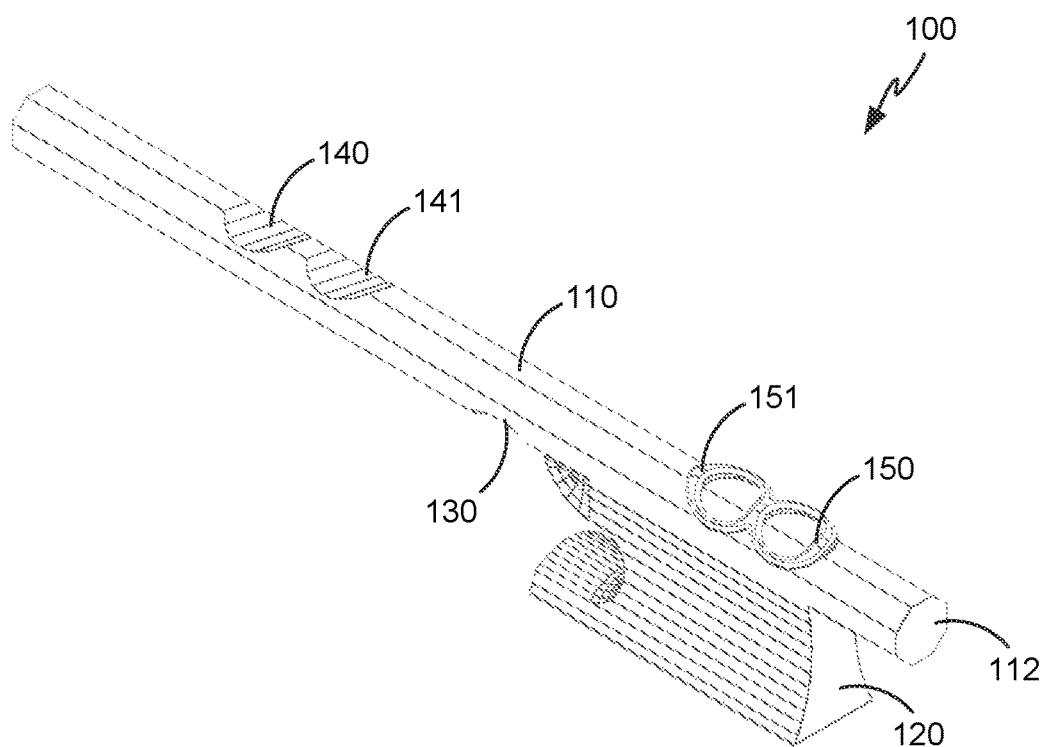
Figure 1D:
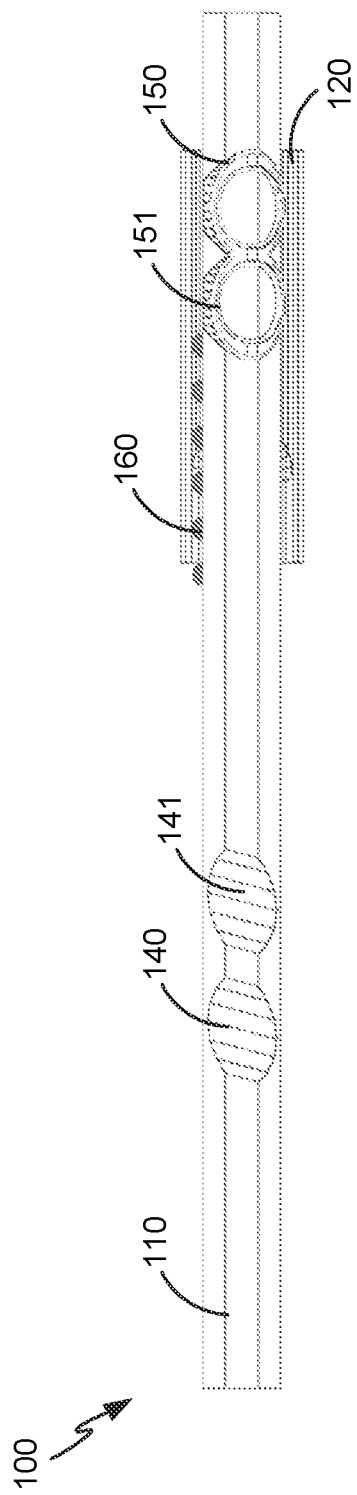
Figure 1E:
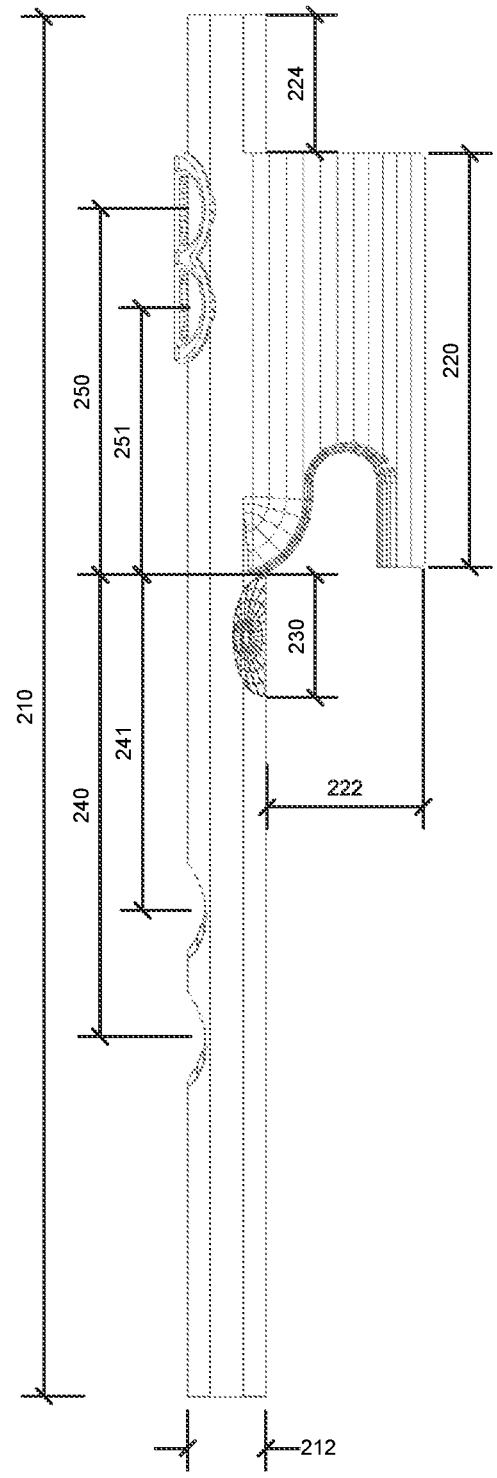

FIGS. 1A-1E illustrate a bow hold training device 100 suitable for learning and practicing proper grip and finger placement for holding a bow for a stringed instrument. Specifically, FIG. 1A provides a front top left isometric view, FIG. 1B provides a rear top right isometric view, FIG. 1C provides a rear top left isometric view, FIG. 1D provides a top view, and FIG. 1E provides a left side view with dimensional measurements of bow hold training device 100. As used herein, directional terms including, but not limited to, top, bottom, front, back, side, right, and left, are merely relative to each other and not an indication of a particular orientation for use of bow hold training device 100.

The bow hold training device 100 includes a replica bow stick shaft 110, a replica bow stick frog 120 extending from a bottom side of the replica bow stick shaft 110, and a variety of landmarks corresponding to finger and thumb contact points for a proper bow hold on the bow hold training device 100. The landmarks represent proper placement for each of the musician's thumb and fingers. While different examples may include fewer contact points, bow hold training device 100 includes landmarks for each digit of a user's hand.

Thumb landmark 130 is on the bottom side of the replica bow stick shaft 110 in front of the replica bow stick frog 120. The thumb landmark 130 provides a tactile surface for receiving the tip of a musician's thumb. In various examples, the thumb landmark 130 may include a negative space, i.e., depression, in the replica bow stick shaft 110 and/or a ring protrusion and/or textured surface on the replica bow stick shaft 110. In the particular example of the bow hold training device 100, thumb landmark 130 is a negative space in the replica bow stick shaft 110.

The use of a negative space, ring protrusion, and/or a textured surface as the thumb landmark 130 provides tactile feedback to the musician's thumb while still facilitating precise placement of the thumb against the replica bow stick shaft 110. Compared to alternative training devices in which a thumb landmark is built-up over a bow stick shaft, thumb landmark 130 provides an easier transition to a regular bow stick as the thumb landmark 130 allows the musician to maintain the same thumb position and contact points instead of an artificial support augmenting the hand posture.

Index finger landmark 140 is on a top side of the replica bow stick shaft 110 in front of the replica bow stick frog 120. The index finger landmark 140 provides a tactile surface for receiving the tip of a musician's index finger. In various examples, the index finger landmark 140 may include a negative space in the replica bow stick shaft 110 and/or a ring protrusion and/or textured surface on the replica bow stick shaft 110. In the particular example of the bow hold training device 100, index finger landmark 140 is a negative space in the replica bow stick shaft 110.

The use of a negative space, ring protrusion, and/or a textured surface as the index finger landmark 140 provides tactile feedback to the musician's index finger while still facilitating precise placement of the index finger against the replica bow stick shaft 110. Compared to alternative training devices in which an index finger landmark is built-up over a non-replica bow stick shaft, index finger landmark 140 provides an easier transition to a regular bow stick as the index finger landmark 140 allows the musician to maintain the same index finger position and contact points with a bow stick shaft instead of an artificial support augmenting the hand posture.

The bow hold training device 100 includes an optional second index finger landmark 141, the second index finger landmark 141 being adjacent to the first index finger landmark 140 on the top side of the replica bow stick shaft 110 in front of the replica bow stick frog 120. Second index finger landmark 141 allows bow hold training device 100 to be used with a smaller grip, e.g., with a musician with a smaller hand than one who would use index finger landmark 140.

Middle finger landmark 160 is on a right side of the replica bow stick frog 120. The middle finger landmark 160 provides a tactile surface for receiving the tip of a musician's middle finger. In various examples, the middle finger landmark 160 may include a textured surface on the side of the replica bow stick frog 120. For example, the textured surface may include an array of bumps on the right side of the replica bow stick frog 120. In other examples, the middle finger landmark 160 may include a negative space in the right side of the replica bow stick frog 120 and/or a ring protrusion and/or textured surface on the right side of the replica bow stick frog 120.

In the particular example of the bow hold training device 100, the middle finger landmark 160 is a ring and middle finger landmark as the array of bumps provides room for both the ring and middle fingers. In other examples, a bow hold training device may include distinct landmarks (e.g., negative space and/or ring protrusions) for one or both of a musician's ring and middle fingers.

The use of texture surface, a negative space and/or a ring protrusion as the middle finger landmark 160 provides tactile feedback to the musician's middle finger while still facilitating precise placement of the middle finger against the replica bow stick frog 120. Compared to alternative training devices in which a middle finger landmark is built-up over a bow stick frog, middle finger landmark 160 provides an easier transition to a regular bow stick as the middle finger landmark 160 allows the musician to maintain the same middle and ring finger position and contact points as on a regular bow stick frog.

Pinkie finger landmark 150 on a top side of the replica bow stick shaft 110 above the replica bow stick frog 120. The pinkie finger landmark 150 provides a tactile surface for receiving the tip of a musician's pinkie finger. In various examples, the pinkie finger landmark 150 may include a negative space in the replica bow stick shaft 110 and/or a ring protrusion and/or textured surface on the replica bow stick shaft 110. In the particular example of the bow hold training device 100, pinkie finger landmark 150 includes a ring protrusion on the replica bow stick shaft 110.

The use of a negative space, ring protrusion, and/or a textured surface as the pinkie finger landmark 150 provides tactile feedback to the musician's pinkie finger while still facilitating precise placement of the pinkie finger against the replica bow stick shaft 110. Compared to alternative training devices in which a pinkie finger landmark is built-up over a bow stick shaft, pinkie finger landmark 150 provides an easier transition to a regular bow stick as the pinkie finger landmark 150 allows the musician to maintain the same pinkie finger position and contact points as on a regular bow stick.

The bow hold training device 100 includes an optional second pinkie finger landmark 151, the second pinkie finger landmark 151 being adjacent to the first pinkie finger landmark 150 on the top side of the replica bow stick shaft 110 above the replica bow stick frog 120. Second pinkie finger landmark 151 allows bow hold training device 100 to be used with a smaller grip, e.g., with a musician with a smaller hand than one who would use pinkie finger landmark 150. In the particular example of the bow hold training device 100, pinkie finger landmark 151 includes a ring protrusion on the replica bow stick shaft 110 in contact with the ring protrusion of pinkie finger landmark 150.

For example, a musician with the smallest hand may use both second index finger landmark 141 and second pinkie finger landmark 151, whereas a musician with an intermediate hand size may use one of second index finger landmark 141 and second pinkie finger landmark 151, in combination with one of index finger landmark 140 and pinkie finger landmark 150. A musician with a larger hand size may use both index finger landmark 140 and pinkie finger landmark 150. Thus, bow hold training device 100 is suitable for a variety of hand sizes. In addition, different examples of bow hold training device 100 may be made in any number of sizes suitable for any hand size.

The replica bow stick shaft 110 may include a transverse cross-section 112 extending along the length 210 of the replica bow stick shaft 110. In some examples transverse cross-section 112 may include a round cross-section or an octagonal cross-section.

In some examples, the bow hold training device 100 is a unitary component including the replica bow stick shaft 110, the replica bow stick frog 120, and the least one landmark.

For example, the unitary component may be formed from a molded polymer, such as an injection molded polymer, such as, but not limited to, acrylic (PMMA), acrylonitrile butadiene styrene (ABS), nylon polyamide (PA), polycarbonate (PC), polyethyelene (PE), polyoxymethylene (POM), polypropylene (PP), polystyrene (PS), thermoplastic elastomer (TPE), and/or thermoplastic polyurethane (TPU). In other examples, bow hold training device 100 may be formed from other materials, such as rubber or metal. Using a unitary molded construction provides a robust and low-cost product for the bow hold training device 100.

The bow hold training device 100 allows a musician to practice and learn a proper bow hold, including grip and finger placement, on a bow for a stringed instrument. A proper bow hold allows a musician to control the path and placement of the bow to vibrate desired strings and produce clear tones. Bow hold training device 100 may be much lighter than a regular bow, allowing the musician to practice a proper bow hold without the weight of a full bow. For example, a standard violin bow is about 29.5 inches long. In contrast, replica bow stick shaft 110 may have a length of 12 inches or less.

In order to practice a bow hold with bow hold training device 100, a musician holds bow hold training device 100 as if it were a standard bow for a stringed instrument. In particular, the musician locates their thumb on the thumb landmark 130, locates their index finger on an index finger landmark 140, 141, locates their pinkie finger on a pinkie finger landmark 150, 151, and locates their ring finger and the middle finger on the frog in contact with the middle finger landmark 160. Practicing a bow hold with bow hold training device 100 in this manner allows the musician to improve hand flexibility and dexterity and consistency of their bow grip for playing a stringed instrument.

FIG. 1E provides a left side view with dimensional notations of bow hold training device 100. The following dimensions are suitable for use with a bow hold training device associated with a violin for most musicians. Dimensions may vary according to the stringed instrument associated with a bow hold training device, and may be adjusted to account for the size of a musician's hand.

Length 210 indicates the total length of the replica bow stick shaft 110. Length 210 may vary widely as the functionality of the bow hold training device 100 is not impacted by the length 210 except that a longer length may add weight to the bow hold training device 100. In some examples, the length 210 may be as long as a standard bow stick shaft, such as between 19.5-30 inches. More preferably, however, this length may be shortened to 12 inches or less to reduce weight of the bow hold training device 100. The minimum length 210 is whatever length is sufficient to allow placement of the index finger landmark 140, i.e., at least 4 inches. In some examples, the length 210 may be between 5 to 10 inches, such as between 5 to 7 inches, such as between 5 to 6 inches.

Width 212 indicates the width of the cross section of the replica bow stick shaft 110. Generally, width 212 is selected to conform to the width of a standard bow stick shaft, such as a width between 0.2 to 5 inches, such as about 0.3 inches.

The replica bow frog 120 is configured to conform to the size shape of a standard bow frog. The replica bow frog 120 includes a flat bottom surface, a flat back surface, concave right and left side surfaces, and an indented front surface. The replica bow frog 120 has a length 220 consistent with that of a standard bow frog, such as a length between 1 to 2 inches, such as about 1.7 inches. The replica bow frog 120 has a height 222 consistent with that of a standard bow frog, such as a height between 0.5 to 1 inch, such as about 0.6 inches.

The location of the replica bow frog 120 on the replica bow stick shaft 110 conforms to the orientation of a standard bow frog on a standard bow shaft. The replica bow frog 120 is offset from the back of the replica bow stick shaft 110 by length 224 to leave room for the pinkie finger landmark 150 on the top side of the replica bow stick shaft 110. In some examples, the offset length 224 may be 0.5 to 2 inches, such as 0.5 to 1 inch, such as about 0.6 inches.

The locations of the landmarks on the bow hold training device 100 correspond to thumb and finger contact points for a proper bow hold. In the particular example of the bow hold training device 100, thumb landmark 130 is a negative space in replica bow stick shaft 110 and is located in front of an immediately adjacent to the front side of frog 120. The width 230 of the negative space is selected to receive a musician's thumb. For example, width 230 may be between 0.25 to 1 inch, such as about 0.5 inches. The maximum depth of thumb landmark 130 may be a proportion of the width, such as 10-50 percent of the width 230, such as about 25 percent of the width 230.

In the particular example of the bow hold training device 100, index finger landmark 140 is a negative space in replica bow stick shaft 110 and is located on a top side of the replica bow stick shaft 110 in front of the replica bow stick frog 120 with an offset distance 240. The offset distance 240 is configured to provide a proper bow hold for an adult musician. In some examples, offset distance 240 may be between 1.5 to 2.5 inches, such as between 1.75 to 2.25 inches, such as about 1.875 inches. Different examples may provide different offsets to fit different sized hands.

Likewise, index finger landmark 141 is a negative space in replica bow stick shaft 110 and is located on a top side of the replica bow stick shaft 110 in front of the replica bow stick frog 120 with an offset distance 241. The offset distance 241 is configured to provide a proper bow hold for a child musician. In some examples, offset distance 241 may be between 1 to 1.75 inches, such as between 1.25 to 1.625 inches, such as about 1.44 inches.

The width and depth of the negative spaces for index finger landmarks 140, 141 are selected to receive a musician's index finger. For example, the widths may be between 0.25 to 1 inch, such as about 0.5 inches. The maximum depth of landmarks 140, 141 may be a proportion of the widths, such as 10 to 50 percent of the width, such as about 25 percent of the width.

In the particular example of the bow hold training device 100, pinkie finger landmark 150 is a ring protrusion in replica bow stick shaft 110 and is located on a top side of the replica bow stick shaft 110 above the replica bow stick frog 120. The offset distance 250 of the pinkie finger landmark 150 is measured from the front of the replica bow stick frog 120 to the center of the ring protrusion. In some examples, offset distance 250 may be between 1.0 to 2.0 inches, such as between 1.25 to 1.75 inches, such as about 1.5 inches. Different examples may provide different offsets to fit different sized hands.

Likewise, pinkie finger landmark 151 is a ring protrusion in replica bow stick shaft 110 and is located on a top side of the replica bow stick shaft 110 above the replica bow stick frog 120. The offset distance 251 of the pinkie finger landmark 151 is measured from the front of the replica bow stick frog 120 to the center of the ring protrusion. The offset distance 251 is configured to provide a proper bow hold for a child musician. In some examples, offset distance 251 may be between 0.5 to 1.5 inches, such as between 0.75 to 1.25 inches, such as about 1.1 inches.

The diameter and height of the ring protrusions for pinkie finger landmarks 150, 151 are selected to receive a musician's pinkie finger. For example, the diameters may be between 0.2 to 0.6 inches, such as about 0.3 inches. The height of the ring protrusions for pinkie finger landmarks 150, 151 as measured above the replica bow stick shaft 110 are selected to provide tactile feedback without interfering with the contact between the pinkie and replica bow stick shaft 110. For example, the heights of the ring protrusions as measured above the replica bow stick shaft 110 may be between 0.05 to 0.2 inches, such as about 0.1 inches. In some examples, the ring protrusion may be combined with a negative space within the ring protrusion. In other examples, a negative space may be used instead of a ring protrusion for one or both of pinkie finger landmarks 150, 151.

The specific techniques for a bow hold training device, including techniques described with respect to bow hold training device 100, are merely illustrative of the general inventive concepts included in this disclosure as defined by the following claims.

What is claimed is:

1. A bow hold training device comprising:
   a replica bow stick shaft;
   a replica bow stick frog extending from a bottom side of the replica bow stick shaft; and
   a thumb landmark on the bottom side of the replica bow stick shaft in front of the replica bow stick frog corresponding to a contact point of a thumb with a proper bow hold on the bow hold training device,
   wherein the thumb landmark includes a negative space in the replica bow stick shaft.

2. The bow hold training device of claim 1, wherein the thumb landmark includes
   a ring protrusion on the replica bow stick shaft.

3. The bow hold training device of claim 1, further comprising an index finger landmark on a top side of the replica bow stick shaft in front of the replica bow stick frog.

4. The bow hold training device of claim 3, wherein the index finger landmark includes one or more of a group consisting of:
   a second negative space in the replica bow stick shaft; and
   a ring protrusion on the replica bow stick shaft.

5. A bow hold training device comprising:
   a replica bow stick shaft;
   a replica bow stick frog extending from a bottom side of the replica bow stick shaft;
   a first index finger landmark on a top side of the replica bow stick shaft in front of the replica bow stick frog corresponding to a contact point of an index finger with a proper bow hold on the bow hold training device; and
   a second index finger landmark, the second index finger landmark being adjacent to the first index finger landmark on the top side of the replica bow stick shaft in front of the replica bow stick frog.

6. The bow hold training device of claim 1, further comprising a pinkie finger landmark on a top side of the replica bow stick shaft above the replica bow stick frog.

7. The bow hold training device of claim 6, wherein the pinkie finger landmark includes one or more of a group consisting of:
   a second negative space in the replica bow stick shaft; and
   a ring protrusion on the replica bow stick shaft.

8. A bow hold training device comprising:
a replica bow stick shaft;
a replica bow stick frog extending from a bottom side of the replica bow stick shaft;
a first pinkie finger landmark on a top side of the replica bow stick shaft above the replica bow stick frog corresponding to a contact point of a pinkie finger with a proper bow hold on the bow hold training device; and
a second pinkie finger landmark, the second pinkie finger landmark being adjacent to the first pinkie finger landmark on the top side of the replica bow stick shaft above the replica bow stick frog.

9. The bow hold training device of claim 1, further comprising a middle finger landmark on a side of the replica bow stick frog.

10. The bow hold training device of claim 9, wherein the middle finger landmark is a ring and middle finger landmark.

11. The bow hold training device of claim 9, wherein the middle finger landmark includes a textured surface on the side of the replica bow stick frog.

12. A bow hold training device comprising:
a replica bow stick shaft;
a replica bow stick frog extending from a bottom side of the replica bow stick shaft; and
a middle finger landmark on a side of the replica bow stick frog corresponding to a contact point of a middle finger with a proper bow hold on the bow hold training device,
wherein the middle finger landmark includes an array of bumps on the side of the replica bow stick frog.

13. The bow hold training device of claim 1, wherein the replica bow stick shaft includes a transverse cross-section selected from a group consisting of:
a round cross-section; and
an octagonal cross-section.

14. The bow hold training device of claim 1, wherein the replica bow stick shaft has a length of 12 inches or less.

15. The bow hold training device of claim 1, wherein the bow hold training device is a unitary component including the replica bow stick shaft; the replica bow stick frog; and the thumb landmark.

16. The bow hold training device of claim 15, wherein the unitary component is formed from a molded polymer.

17. A bow hold training device comprising:
a replica bow stick shaft;
a replica bow stick frog extending from a bottom side of the replica bow stick shaft;
a thumb landmark on the bottom side of the replica bow stick shaft in front of the replica bow stick frog corresponding to a contact point of a thumb with a proper bow hold on the bow hold training device,
wherein the thumb landmark includes a negative space in the replica bow stick shaft;
an index finger landmark on a top side of the replica bow stick shaft in front of the replica bow stick frog; and
a pinkie finger landmark on the top side of the replica bow stick shaft above the replica bow stick frog.

18. The bow hold training device of claim 17,
wherein the bow hold training device is a unitary component including the replica bow stick shaft, the replica bow stick frog, the thumb landmark, the index finger landmark, and the pinkie finger landmark,
wherein the unitary component is formed from a molded polymer.

19. A method of practicing a bow hold with a bow hold training device, the bow hold training device comprising:
a replica bow stick shaft,
a replica bow stick frog extending from a bottom side of the replica bow stick shaft,
a thumb landmark on the bottom side of the replica bow stick shaft in front of the replica bow stick frog corresponding to a contact point of a thumb with a proper bow hold on the bow hold training device,
wherein the thumb landmark includes a negative space in the replica bow stick shaft,
an index finger landmark on a top side of the replica bow stick shaft in front of the replica bow stick frog, and
a pinkie finger landmark on the top side of the replica bow stick shaft above the replica bow stick frog, the method comprising:
locating the thumb of a user on the thumb landmark;
locating the index finger of the user on the index finger landmark;
locating the pinkie finger of the user on the pinkie finger landmark; and
locating the ring finger and the middle finger of the user on the replica bow stick frog.

20. The bow hold training device of claim 12, wherein the middle finger landmark is a ring and middle finger landmark.

* * * * *